(12) United States Patent
Möhlmann (10) Patent No.: US 10,920,836 B2
(45) Date of Patent: Feb. 16, 2021

(54) HYDRAULIC CLUTCH ACTUATION WITH ON-DEMAND CLUTCH OILING

(71) Applicant: GKN Automotive Ltd., Redditch Worcestershire (GB)

(72) Inventor: Reinhard Möhlmann, Bergisch Gladbach (DE)

(73) Assignee: GKN Automotive Ltd., Redditch (GB)

( * ) Notice: Subject to any disclaimer, the term of this patent is extended or adjusted under 35 U.S.C. 154(b) by 150 days.

(21) Appl. No.: 16/308,544

(22) PCT Filed: Jun. 14, 2017

(86) PCT No.: PCT/EP2017/064591
§ 371 (c)(1),
(2) Date: Dec. 10, 2018

(87) PCT Pub. No.: WO2017/216249
PCT Pub. Date: Dec. 21, 2017

(65) Prior Publication Data
US 2019/0145470 A1     May 16, 2019

(30) Foreign Application Priority Data

Jun. 14, 2016    (DE) ........................ 10 2016 110 915

(51) Int. Cl.
*F16D 25/12*    (2006.01)
*F16H 48/19*    (2012.01)
(Continued)

(52) U.S. Cl.
CPC .......... *F16D 25/123* (2013.01); *B60K 17/346* (2013.01); *B60K 17/3515* (2013.01);
(Continued)

(58) Field of Classification Search
CPC .... F16D 25/123; F16D 25/0638; F16D 25/10; F16D 25/14; B60K 17/3515;
(Continued)

(56) References Cited

U.S. PATENT DOCUMENTS

| 2004/0129475 A1 | 7/2004 | Forsyth |
| 2004/0159523 A1* | 8/2004 | Duan ................... F16D 48/066 |
| | | 192/70.12 |

(Continued)

FOREIGN PATENT DOCUMENTS

| DE | 20221469 U1 | 2/2006 |
| DE | 102010036826 A1 | 2/2012 |

(Continued)

OTHER PUBLICATIONS

Japanese Patent Office Notice of Reason for Rejection for JP2018-565813 dated Feb. 7, 2020 (with English translation; 35 pages).
(Continued)

*Primary Examiner* — David J Hlavka
(74) *Attorney, Agent, or Firm* — Bejin Bieneman PLC (57) ABSTRACT

In a hydraulic clutch actuation system for controlling in particular a clutch-controlled compensation unit of a drive-train of a motor vehicle, in which hydraulic clutch actuation system a hydraulic pump is used for generating hydraulic pressure in a hydraulic fluid for the purposes of clutch actuation by means of a hydraulic clutch actuation device, provision is made whereby the hydraulic fluid is supplied as clutch oil to the friction members of the friction clutch which are to be oiled with clutch oil (cooling and/or lubricating oil). In this way, improved and more reliable oiling of the clutch can be made possible even at low vehicle speeds and under heavy clutch load, wherein, despite this, very rapid dry-running of the cutches, and low power losses generated by the clutch oiling, are ensured.

20 Claims, 5 Drawing Sheets (51) Int. Cl.
  *F16H 48/22*   (2006.01)
  *F16H 48/32*   (2012.01)
  *B60K 17/35*   (2006.01)
  *F16H 48/12*   (2012.01)
  *B60K 23/08*   (2006.01)
  *B60K 17/346*  (2006.01)
  *F16D 25/0638* (2006.01)
  *F16D 25/10*   (2006.01)
  *F16D 48/02*   (2006.01)

(52) U.S. Cl.
  CPC ...... *B60K 23/0808* (2013.01); *F16D 25/0638* (2013.01); *F16D 25/10* (2013.01); *F16D 25/14* (2013.01); *F16H 48/12* (2013.01); *F16H 48/19* (2013.01); *F16H 48/22* (2013.01); *F16H 48/32* (2013.01); *B60Y 2400/4244* (2013.01)

(58) Field of Classification Search
  CPC .......... B60K 17/230808; B60K 17/346; F16H 48/12; F16H 48/22; F16H 48/32; F16H 48/19; B60Y 2400/4244
  See application file for complete search history.

(56) References Cited

U.S. PATENT DOCUMENTS

| | | |
|---|---|---|
| 2005/0023102 A1 | 2/2005 | Brissenden |
| 2014/0008172 A1* | 1/2014 | Lundstrom ............ F16D 48/02 192/70.12 |
| 2016/0010698 A1* | 1/2016 | Lundstrom ........... F16D 25/123 251/28 |
| 2016/0032986 A1* | 2/2016 | Pritchard ............ F16H 61/0206 192/85.61 |

FOREIGN PATENT DOCUMENTS

| | | |
|---|---|---|
| DE | 102011102277 A1 | 11/2012 |
| EP | 2574826 A1 | 4/2013 |
| JP | 2004019769 A | 1/2004 |
| JP | 2011149516 A | 8/2011 |
| WO | 2013045444 A1 | 4/2013 |
| WO | 2015090392 A1 | 6/2015 |

OTHER PUBLICATIONS

International Search Report and Written Opinion for PCT/EP2017/064591 dated Nov. 13, 2017 (with English translation; 18 pages).
International Preliminary Report on Patentability for PCT/EP2017/064591 dated Dec. 27, 2018 (12 pages).

* cited by examiner

HYDRAULIC CLUTCH ACTUATION WITH ON-DEMAND CLUTCH OILING

CROSS-REFERENCE TO RELATED APPLICATIONS

This application is a national stage of, and claims priority to, Patent Cooperation Treaty Application No. PCT/EP2017/064591, filed on Jun. 14, 2017, which application claims priority to German Application No. DE 10 2016 110 915.0, filed on Jun. 14, 2016, which applications are hereby incorporated herein by reference in their entireties.

BACKGROUND

Herein the term "motor vehicle" refers in particular to a car. The term "compensation unit" means a clutch-controlled compensation unit with or without a differential, incorporated in the drive train of a motor vehicle and having a clutch device which can influence the transmission of the drive power to different drive wheels. "Compensation units" are in particular transverse compensation units or longitudinal compensation units which can compensate for differential rotation speeds of individual drive wheels occurring in a drive train of a motor vehicle, such as occur on cornering between the right or left wheel of an axle (transverse compensation) or between the wheels of the front and those of the rear axle (longitudinal compensation).

Describing a compensation unit as "clutch-controlled" means, for example, in relation to a transverse compensation unit, that the torque transmission is regulated via the switching state of the friction clutch such that when the clutch is open, drive torque is not transmitted via the transverse compensation unit even with adequate friction values between the two wheels of the relevant axle connected to the compensation unit and the road surface. In clutch-controlled compensation units, even with adequate friction values between the wheels and road surface, transmission of a torque and preferably also distribution of the torque to the individual wheels or other drive train components requires a switching state of the clutch in which this is at least partially closed, i.e., switched to transmit torque. Accordingly, conventional positive-action differentials with clutches which can only be used as differential locks are not regarded as "clutch-controlled" transverse compensation units, since such differentials transmit torque even when the clutch is open and there is adequate friction between the road surface and the two drive wheels. The same applies to clutch-controlled longitudinal compensation units and the transmission of a torque to the axles driven thereby.

Hydraulically actuated clutch units for transverse or longitudinal compensation units of a motor vehicle, in which there is a need for either cooling and/or lubrication for certain components (e.g., roller bearings or intermeshing gearwheels) and in particular for clutches, depending on operating state, or in which oiling should be omitted in order to avoid unnecessary power losses in certain operating states, are known for example from DE 10 2010 036 826 A1, EP 2 574 826 A1 or WO 2013/045444 A1. In some of these systems, the clutches are supplied with cooling or lubricating oil via oil delivery devices, wherein various measures guarantee that the oil delivery devices are shut down in certain operating states in which there is no oiling requirement, so that the clutches can run completely dry in particular to avoid power losses due to fluid friction or sustained splash losses. Nonetheless, splash losses remain unavoidable at least in operating states in which components necessary for oil delivery must be immersed in an oil reservoir in order to deliver oil for cooling and/or lubrication of certain components. This type of oil delivery is generally inefficient in relation to the cooling and/or lubricating oil volume flow effectively required, and is accompanied by power losses.

Furthermore, WO 2015/090392 A1 discloses loading clutch actuation devices of clutches of a clutch-controlled transverse compensation unit with hydraulic pressure by means of a hydraulic pump driven via a speed-controlled electric motor.

The disadvantage of the above-mentioned compensation units and their oiling systems is that the clutches require a relatively long time to run completely dry, so that a drag moment caused by fluid friction is sustained for a relatively long time.

Also, such systems require two separate oil circuits, one for supplying the friction clutches with cooling or lubricating oil and another for actuating the clutch using pressurized oil, and consequently also require an effective separation of lubricating and cooling oil on the one side and pressurized oil on the other by corresponding structural measures.

In addition, the supply of cooling or lubricating oil for the clutch in many operating states does not correspond to the actual acute need for clutch oiling, since the clutch oiling depends decisively on the rotation speed of the crown wheels functioning as the oil delivery devices, the oiling potential of which is however in turn determined by the vehicle speed. Thus, for example on start-up, on very slow driving on a terrain which applies particular stress to the transverse compensation unit with the friction clutches, or when engaging a previously shut-down part of a secondary drive train, an adequate oil supply only builds up slowly or not to a sufficient extent, although the clutches have an increased need for oiling for lubrication and cooling in precisely these driving states.

SUMMARY

The present disclosure relates to a clutch-controlled compensation unit for a motor vehicle, with a hydraulic clutch actuation system for controlling the clutch-controlled compensation unit within a drive train of a motor vehicle, wherein for actuation of at least one friction clutch of the compensation unit, the clutch actuation system comprises a hydraulic pump which can be operated independently of driving state, in particular driven by an electric motor, for generating a hydraulic pressure in a hydraulic fluid, wherein at least one clutch actuation device is provided for actuating the at least one friction clutch, on which the hydraulic pressure generated by the hydraulic pump may act as a clutch actuation pressure via a clutch pressure line, and wherein the compensation unit comprises assembly components, in particular friction members of the friction clutch, which are to be oiled with cooling and/or lubricating oil for lubrication and/or cooling via an oiling line, for example a clutch oiling line. The disclosure furthermore concerns a method for operating such a compensation unit.

In this context, a clutch-controlled compensation unit of the type described above can be provided with a clutch oiling and actuation system, and in particular a transverse compensation unit with such a clutch oiling and actuation system, which allows an improved and more reliable oiling of the clutch and can ensure adequate oiling even at low vehicle speeds and under heavy clutch load. Despite this, a very rapid dry-running of the clutches is possible and the power losses generated by the clutch oiling are reduced, with simultaneous high quality of the pressure regulation of the clutch actuation system responsible for clutch control.

The volume flow delivered by the hydraulic pump, in particular the return volume flow occurring on activation of the clutch actuation device, is supplied at least partially to the assembly components, in particular the at least one friction clutch, as cooling and/or lubricating oil.

Preferably, the oiling line branches off the clutch pressure line. The hydraulic fluid, which as pressurized oil actuates the clutch actuation device, may be conducted to the components requiring oiling as cooling and/or lubricating oil. In particular, the hydraulic fluid may be conducted to the friction members as clutch oil (cooling and/or lubricating oil for the friction members of the clutch).

Because there is no need for a cooling and lubricating oil circuit (in particular clutch oil) to be separate from the pressurized oil circuit providing the clutch pressure, and both the clutch actuation and the supply of cooling and/or lubricating oil to the assembly components, in particular the multiplate clutches normally used as clutch devices, are combined into one oil circuit and preferably are also supplied with oil by means of the same oil delivery device which also supplies the clutch pressure for the clutch actuation, the disadvantages known from the prior art are largely eliminated.

Because the hydraulic pump, which can be operated independently of driving state, in particular driven by an electric motor, is decoupled from drive train components which rotate more quickly or more slowly depending on vehicle speed or engine rotation speed, it guarantees a build-up of hydraulic pressure which is independent of driving state and which need not be dependent on vehicle speed or engine rotation speed. At the same time, a hydraulic pump driven in this way allows the pump to be shut down and hence avoids the associated power losses in operating states in which a pump, in particular mechanically coupled to the drive train components, is system-driven.

In particular, this gives an improved and more reliable supply of cooling and/or lubricating oil to the assembly components, in particular the thermally highly stressed clutch(es) but also bearings and wheelsets, even at low vehicle speeds and in driving states such as start-up or extremely slow driving for example in heavy terrain. The otherwise necessary separation of a pressurized oil circuit from a clutch oil circuit may be omitted, which leads to savings. Also, oiling of the assembly components, in particular the clutches, is independent of the oil level existing in the clutch or differential housing.

If one and the same oil delivery device provides both the clutch pressure for clutch control and the oil pressure or oil volume flow necessary for component oiling, in particular for clutch oiling, this means that the regulation which is advantageous for the clutch system (in which the oiling line, in particular the clutch oiling line, is then supplied with cooling and/or lubricating oil only if the clutch pressure line is also loaded with clutch pressure) is inherent in the system. If no oil pressure is provided for closing the clutch and hence for transmitting torque, due to the absence of hydraulic pressure, no component oiling takes place (in this case, it is not necessary). Therefore, because of its basic structural design, the system forms an "on-demand" oiling system in which for example clutch oiling or oiling of other assembly components with cooling and/or lubricating oil takes place only if torque is actually transmitted by means of the clutches, and hence oiling is required because the clutches are for example loaded. As soon as the oil delivery device no longer provides pressure because no more torque need be transmitted via the clutches, the component and clutch oiling stops immediately without further action, in a manner intrinsic to the system.

Also, the system can in this way regulate itself intrinsically to a great extent, such that if the oil delivery device provides a particularly high pressure, in particular the maximum system pressure, for transmitting a high torque and there is a particularly high demand for oiling, the system can also provide a high oil volume flow for clutch oiling.

This is relevant for example when, in a clutch-controlled transverse or longitudinal compensation unit without differential, despite a high torque loading on the clutches, a differential rotation speed existing between two wheels of an axle or between the front and rear axle is to be dissipated via the clutches. In such a case, the energy delivery to the friction members of the clutch allowing the slip is particularly high, and there is a particularly high oiling demand with such a load on the clutch. Thus for example in an all-wheel drive vehicle, the thermal energy input into the clutch allowing the slip is particularly high, even in everyday driving states such as cornering in which differential rotation speeds both between the front and rear axles and between the right and left drive wheels of an axle are to be dissipated via the at least one clutch. In contrast to clutch actuation systems in which it can be assumed that the clutch is completely closed under maximum hydraulic pressure and hence maximum clutch pressure, and therefore there is no oiling demand, in particular no cooling demand since the clutch allows no slip, this is not the case in clutches of clutch-controlled compensation units. Here, driving states which require maximum hydraulic pressure often coincide with a maximum oiling demand.

The clutch actuation system may accordingly guarantee in particular that the higher the torque to be transmitted via the clutches, the higher the volume flow which can be taken from the system for clutch oiling. The clutch actuation system may be configured such that under a high hydraulic pressure, in particular a maximum hydraulic pressure provided by the hydraulic pump, a cooling and lubricating oil supply to the friction members of the at least one friction clutch is guaranteed. In particular, there may then be no need for oil shut-off, by means of which, when the clutch is fully closed and loaded to maximum system pressure, the clutch oiling is stopped or blocked because it is assumed that in this state there is no oiling demand due to absence of clutch slip.

Preferably, the assembly components are oiled via component oiling diaphragms, and clutches via clutch oiling diaphragms, wherein the clutch actuation system is calibrated by adjusting the oiling diaphragms and hydraulic pump. Oiling diaphragms are suitable for effectively and economically restricting the volume flow of the oil stream used for clutch oiling, and when the effective passage cross-section is dimensioned accordingly, at the same time they guarantee a sufficiently high line resistance for rapid build-up of the pressure level necessary for activating the clutch actuators. Via the suitable diaphragm passage cross-section, not only can the necessary pressure-dependent oiling characteristics of the system be set correctly, but also a high-quality pressure regulation can be achieved because, due to their hydraulic resistance, the diaphragms allow firstly a steep pressure rise but at the same time also a rapid pressure fall immediately following a reduction in rotation speed of the hydraulic pump. Thus the system can be calibrated by matching the pump power and oiling diaphragms to each other. As the narrowest point, the oiling diaphragms here define the hydraulic resistance of the system. The oiling diaphragms and hydraulic pumps may also be used independently of the design of the compensation unit.

As a whole, due to the measures described above, there is a significant increase in efficiency, not only because of the significant reduction or even complete avoidance of any splash losses even with a loaded clutch device and simultaneous component oiling. Rather, the return volume flow occurring in a hydraulic pressure regulation system and resulting from activation of a hydraulic clutch actuation device by means of a hydraulic pump, which is regulated by rotation speed and/or pressure and delivers a continuous volume flow in operation to build up the clutch actuation pressure, is not simply returned unused to a hydraulic fluid reservoir. Rather, the return volume flow occurring is conducted in targeted fashion to components requiring oiling as cooling and/or lubricating oil, in particular to the clutch as clutch oil.

The oiling diaphragms are preferably calibrated such that, in operation, i.e., at a pressure level occurring for clutch actuation in proper use and with normal operating temperatures, they allow an oil volume flow for component or clutch oiling up to maximum 1.5 l/min.

Preferably, in the clutch actuation system, at least one clutch control valve is provided via which the clutch pressure is controlled, wherein the clutch pressure line is formed by a line portion running between the at least one clutch control valve and the clutch actuation device, and wherein the oiling line, in particular a clutch oiling line, branches off the clutch pressure line downstream of the clutch control valve. In such an arrangement in which the branch point of the oiling line is arranged downstream of the clutch control valve, the oiling line, in particular the clutch oiling line, is supplied with the hydraulic fluid only when the clutch pressure lines are also loaded with clutch pressure.

It may however also be provided that the oiling line, in particular the clutch oiling line, branches off a distribution line which is formed by a line portion running between the hydraulic pump and the at least one clutch control valve. Here, the branch point of the oiling line is arranged upstream of the clutch control valve. Such an arrangement allows the possibility of decoupling the oiling line, in particular the clutch oiling line, from the clutch control valves such that the pressure prevailing in the oiling line is not dependent directly on the clutch pressure prevailing in the clutch pressure line and regulated by the clutch control valve, but can be set independently thereof. Despite this, this system also guarantees that in driving states with high clutch pressure and simultaneous maximum energy input into the friction members, the maximum oiling power can be applied.

The oiling line, in particular the clutch oiling line, preferably has one or more oiling branches, wherein a main oiling diaphragm is provided in the oiling line which supplies the individual oiling branches and is connected upstream of the oiling branches. Such a measure also determines the cooling and/or lubricating oil flow, in particular the clutch oil flow, via the differential pressure occurring over the main oiling diaphragm. In the individual oiling branches departing from the oiling line, further oiling diaphragms may then be provided via which the distribution of the oil flow can be set for each individual oiling point by the selection of the through-flow resistances provided by the oiling diaphragms.

In an advantageous embodiment, in particular as an alternative to a main oiling diaphragm, it may furthermore be provided that a controllable oiling control valve is arranged in the oiling line, in particular the clutch oiling line. This allows the cooling and/or lubricating oil flow, in particular the clutch oil flow, to be set independently of the differential pressure ratio. In comparison with the use of a (main) oiling diaphragm, a significantly higher oil volume flow range can be covered and, depending on operating state, significantly less energy is required to provide the necessary oil volume flow.

A further advantage of the use of an oiling control valve in the oiling line, in particular the clutch oiling line, is that the oil volume flow can be regulated independently of the torque demand of the clutches and the corresponding clutch pressure. It is also possible to stop the oiling completely despite a torque demand of the clutches, which may be useful when the clutches are closed completely, i.e., without slip, so that clutch oiling is superfluous. However, such a configuration also guarantees that a high oiling power can be applied very rapidly at the moment in which the friction clutch, despite the high clutch pressure present, experiences a high energy input, for example because suddenly compensation is required for a differential rotation speed by the friction members of this clutch (e.g., on cornering) despite a high torque to be transmitted.

The oiling control valve can be a VBS (Variable Bleed Solenoid). The use of such valves, which have a specific valve leakage by their very design, may be advantageous in a system in which components of the compensation unit can be oiled via a defined oiling leakage from a clutch pressure line connected downstream of the valve. The oiling leakage is covered by the valve leakage inherent in the valve. The valve may therefore be operated in a position which is more favorable for its controllability and guarantees a higher leakage flow.

Although the clutch oiling line must serve to supply the clutches with cooling or lubricating oil when a torque demand is present, evidently one or more component oiling lines may branch off the clutch oiling line. The term "component oiling"—in contrast to "clutch oiling"—means in particular the oiling of components such as gearwheels or roller or plain bearings which are not directly assigned to the clutch and which must be oiled in particular independently of an oiling demand occurring at the clutches. This may in particular concern components which are dragged by the wheels rolling on the road, and therefore also rotate when the clutches are fully open and no vehicle drive power is transmitted via the compensation unit. The component oiling lines may evidently also be provided with oiling diaphragms. The component oiling lines preferably branch off the clutch oiling line.

The controllable oiling control valve may be connected upstream of the branch point of the component oiling lines, wherein then it is not simply possible to select between simultaneous clutch and component oiling on one side and exclusively component oiling on the other.

To allow the system to be controlled such that firstly the clutches and components which need only be oiled with simultaneous clutch oiling demand, and secondly the components which must be oiled independently of any clutch oiling demand, can be oiled independently of each other, a shut-off valve may be arranged in the clutch oiling line which only opens the clutch oiling line when an adequate opening pressure threshold has been reached. If the controllable oiling control valve is connected upstream of the shut-off valve, as long as the shut-off valve is closed, the oiling control valve can supply oil exclusively to the components which must be oiled independently of any existing clutch oiling demand, while the portion of the oiling line which oils the clutches remain blocked.

The shut-off valve may be switched by pressure, in particular switched by system pressure or clutch pressure, wherein on the control side it may be connected via a control line to a distribution line or to at least one clutch pressure line. The control line may branch off the distribution line at a branch point, wherein the oiling control valve can be arranged between this branch point and the shut-off valve. In this way, the shut-off valve is switched only when the hydraulic pump provides sufficient system pressure to exceed the opening pressure threshold. At the same time, the oiling control valve may open before reaching the opening pressure threshold, in order to oil the components which require oiling even when the clutches should not be oiled. The control line may however evidently also branch off the clutch pressure lines, so that the clutch pressure is decisive for determining whether or not the opening pressure threshold has been exceeded.

In a further embodiment of a compensation unit provided with two clutches, in which the power transmission to one drive wheel is controlled via one clutch and in which a first clutch pressure line is provided for the first friction clutch and a second clutch pressure line for a second friction clutch, in order to load the clutch actuation devices of both clutches with clutch pressure, it may be provided that the first clutch pressure line and the second clutch pressure line are each connected to an input of the changeover valve, wherein the shut-off valve is connected on the control side to the output of the changeover valve via a control line. This ensures that when different pressure levels prevail in the two clutch pressure lines, always the higher pressure is used for determining whether or not the opening pressure threshold of the shut-off valve has been exceeded, and hence the oiling behavior is oriented toward the clutch which is more heavily pressurized.

The hydraulic pump can be controlled by rotation speed and/or regulated by torque, so that a change in hydraulic pressure takes place via a change in rotation speed of the hydraulic pump and preferably due to a deviation of the nominal clutch moment from a momentary actual value by means of a regulation intervention, in particular due to an increase or reduction in a torque demand. This allows firstly simple regulation of the system pressure via the rotation speed of the hydraulic pump, and prompt adaptation of the pressure level and hence the clutch moment when requirements change, and secondly also an immediate shut-off.

The disclosure furthermore concerns a method for operating a clutch-controlled compensation unit in which a hydraulic pressure is generated in a hydraulic fluid by means of a hydraulic pump; a clutch actuation device, in particular of a friction clutch comprising friction members, is loaded with a hydraulic clutch pressure via a clutch pressure line; and the assembly components of the compensation unit, in particular the friction members of the friction clutch, are oiled with cooling and/or lubricating oil via an oiling line for the purpose of lubricating and/or cooling the assembly components. In particular, the friction members of the friction clutch are supplied with cooling and/or lubricating oil (clutch oil). The assembly components, in particular the friction members of the friction clutch, are supplied with hydraulic fluid as clutch oil for oiling.

SUMMARY OF THE DRAWINGS

Further features and advantages of the invention arise from the subclaims and from the following description of preferred exemplary embodiments with reference to the drawings.

The drawings show.

DESCRIPTION

In the figures described below, description is provided with reference to a clutch-controlled transverse compensation unit. The letters "L" and "R" assigned to specific reference signs in some figures stand respectively for the left ("L") and right ("R") component of the partially symmetrical basic structure of the embodiment shown in some of the figures.

The figures show two different variants of a clutch-controlled transverse compensation unit, of which one is equipped with a clutch and a differential, and the other works without a differential and has two clutches $K_L$ and $K_R$, wherein the clutch $K_L$ transmits the drive power to the left drive wheel and the clutch $K_R$ transmits the drive power to the right drive wheel. The clutch actuation systems depicted for the respective compensation units, and the respective oiling architecture and the use of the components used here, may be transferred accordingly from the one variant to the other taking into account the omission or addition of a clutch.

Figure 1:
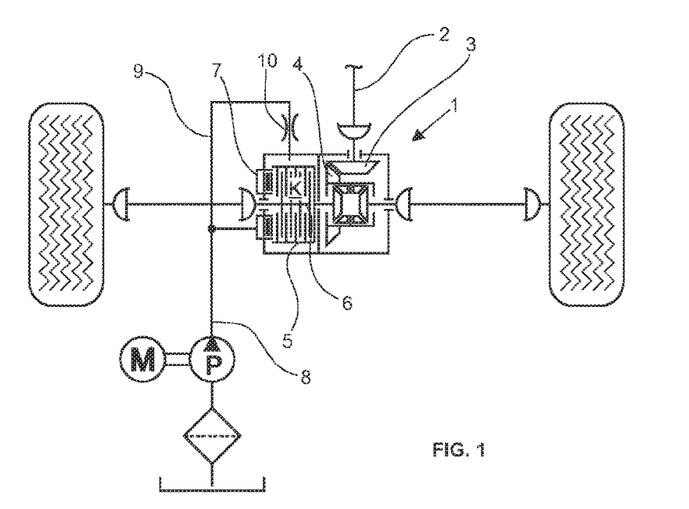
FIG. 1: a diagrammatic depiction of a hydraulic clutch actuation system of a clutch-controlled transverse compensation unit with a clutch and a positive-action differential.

In FIG. 1, a clutch-controlled transverse compensation unit 1 of an axle of a car is shown together with a clutch actuation system in a simplified, diagrammatic view. Depending on the clutch state, the transverse compensation unit shown in FIG. 1 may transmit torque to both drive wheels. When the clutch is open, no torque is transmitted; when the clutch is closed, torque is transmitted, wherein the amount of the transmitted torque is dependent on the set clutch slip which is regulated via the level of hydraulic clutch pressure provided by a pump P. If the clutch is closed completely (slip-free), the transverse compensation unit shown works like a conventional positive-action differential.

The drive power of the vehicle drive is transferred via an input member 2, such as a cardan shaft, and an associated drive wheel 3 to a crown wheel 4, and from there transmitted to an input plate carrier 5 (in FIG. 1, the outer plate carrier), to which axially displaceable input plates are assigned in a rotationally fixed fashion. These input plates cooperate with output plates, which in turn are assigned in an axially displaceable but rotationally fixed fashion to an output plate carrier 6 (in FIG. 1, the inner plate carrier). The resulting clutch unit K constitutes a multiplate clutch known in principle.

A clutch actuation device with a hydraulically actuated clutch actuator A is assigned to the clutch unit, and is supplied with pressurized oil by a hydraulic pump P driven in rotation by a speed-controlled electric motor M, wherein the clutch device delivers oil permanently during operation in order to build up the clutch actuation pressure, creating a return volume flow.

A branch point which opens into a clutch oiling line $9_1$ provided with an oiling diaphragm 10 is arranged in the hydraulic line leading from the hydraulic pump to the clutch actuator; said clutch oiling line supplies the clutch K with clutch oil (cooling or lubricating oil) since the return volume flow occurring on hydraulic clutch actuation is conducted via the clutch oiling line to the clutch K as clutch oil (cooling and/or lubricating oil for the clutch plates).

Depending on the pressure level provided by the pump P, which can build up rapidly when the pump P or the motor M driving the pump P is switched on, despite the basically open oiling diaphragm 10 with its very limited passage cross-section, at the same time as the build-up of the pressure level for switching the clutch, the clutch K is supplied with clutch oil which is used for lubricating and cooling the friction plates.

When the motor M and hence the pump P are switched off, the pressure in the oil lines 8 and 9—fed by the same pump P and belonging to the same oil circuit—rapidly falls, the clutch opens and at the same time, without further measures, the clutch oiling also stops so that the clutch runs dry quickly with a rapid reduction of any hydrodynamic friction effects.

Figure 2:
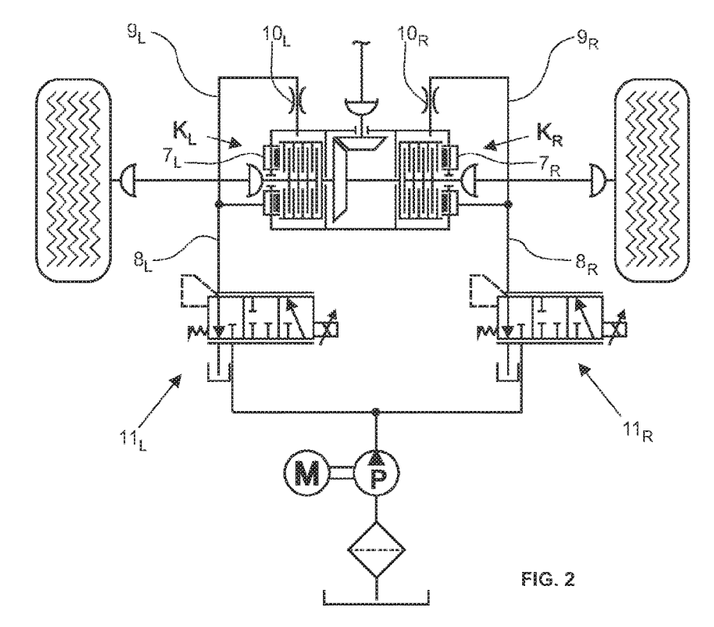
FIG. 2: a diagrammatic depiction of a hydraulic clutch actuation system of a clutch-controlled transverse compensation unit working without differential, with two clutches and a clutch control valve per clutch.

FIG. 2 shows a structure of a transverse compensation unit working solely by frictional locking, in which the torque to be distributed to the two drive wheels is transmitted exclusively via two friction clutches $K_L$ and $K_R$ to the drive wheels assigned to the respective clutches. In contrast to FIG. 1, there is no differential with positively intermeshing drive members. The compensation unit constitutes a clutch-controlled transverse compensation unit working without differential.

The pressure provided by the hydraulic pump P is conducted to the respective clutch actuator 7 of the respective clutch via two normally closed VFS (Variable Force Solenoid) control valves $11_L$ and $11_R$ via the clutch pressure lines $8_L$ and $8_R$. By corresponding control of the control valves $11_R$ and $11_L$, the pressure is regulated clutch-specifically to the pressure level required for the respective driving state, so that the drive power transmitted via the clutches can be set individually for each drive wheel.

Each of the two clutches has an assigned clutch oiling line 9, by means of which the oil required for clutch oiling is conducted to the respective clutch via a respective oiling diaphragm 10. The clutch oiling lines $9_L$ and $9_R$ are arranged behind the control valves $11_L$ and $11_R$, viewed from the hydraulic pump P, and branch off the clutch pressure lines $8_L$ and $8_R$. This guarantees that each clutch is supplied with clutch oil exclusively when the control valves apply clutch pressure to the clutch actuators 7 for closing the clutches.

Figure 3:
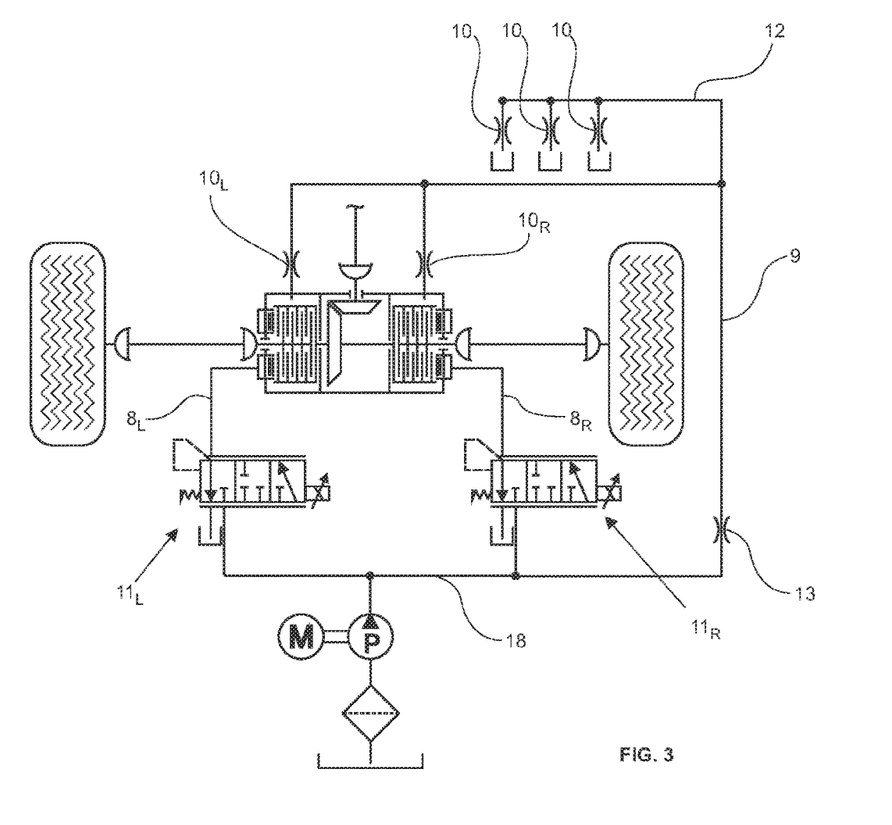
FIG. 3: a diagrammatic depiction of a hydraulic clutch actuation system of a clutch-controlled transverse compensation unit working without differential, with two clutches, a clutch control valve per clutch, and a main oiling diaphragm in a clutch oiling line.

The exemplary embodiment shown in FIG. 3 largely corresponds to the exemplary embodiment shown in FIG. 2 with regard to the configuration of the clutch-controlled compensation unit, wherein the clutch control system has a clutch oiling line 9, which however, in contrast to the oiling lines 9 shown in FIGS. 1 and 2, branches off before the clutch control valves when viewed from the hydraulic pump P. A main oiling diaphragm 13 is provided in the clutch oiling line 9, across which in operation a differential pressure exists which can effectively limit and reduce the maximum oiling pressure occurring at the individual oiling points.

An oiling branch 12 is provided which branches off the clutch oiling line leading to the clutches downstream of the main oiling diaphragm, and via which for example gearwheels or bearings can be oiled. Also, the oiling points supplied by this oiling branch 12 are provided with oiling diaphragms 10 which are adapted to the oiling demand at the respective oiling point.

Figure 4:
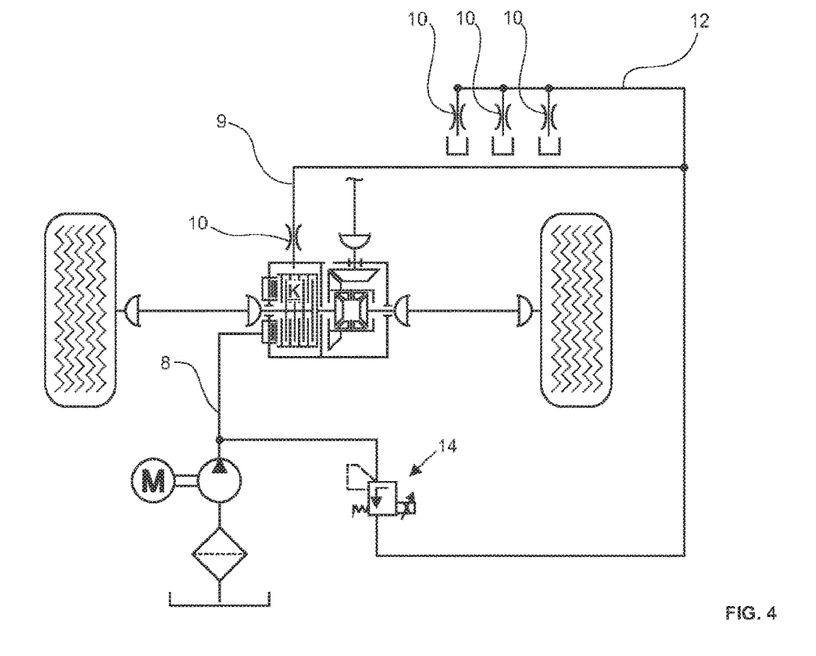
FIG. 4: a diagrammatic depiction of a hydraulic clutch actuation system of a clutch-controlled transverse compensation unit with a clutch and positive-action differential, with an oiling control valve in a clutch oiling line.

FIG. 4 illustrates a clutch actuation system for a transverse compensation unit as also shown in FIG. 1. In contrast to FIG. 1, an oiling control valve 14 is provided in the clutch oiling line 9 in the form of a VBS (Variable Bleed Solenoid, preferably normally open). The oil volume flow available for clutch oiling can be significantly increased in comparison with the use of a main oiling diaphragm in the clutch oiling line, with simultaneously lower power consumption of the hydraulic pump. The clutch oil volume flow may furthermore be set independently of the vehicle speed, the torque demand of the clutch, and the differential rotation speed between the two drive wheels.

Inside the clutch oiling line 9 with the oiling branch 12, the oil volume flow is distributed in the same way as in FIG. 3 via the hydraulic resistances of the oiling diaphragms provided upstream of the individual oiling points.

Figure 5:
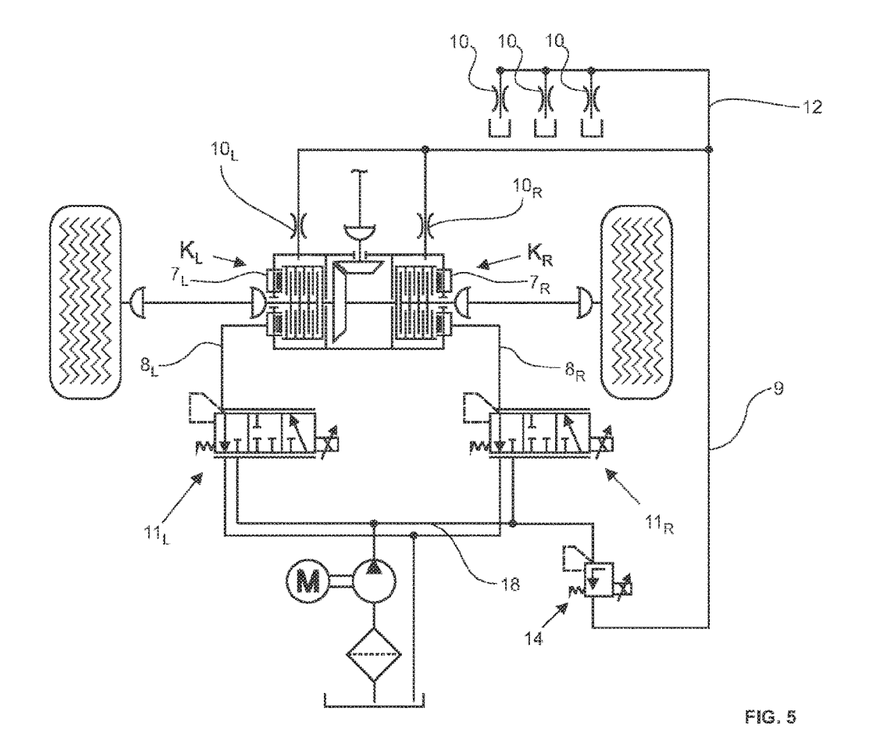
FIG. 5: a diagrammatic depiction of a hydraulic clutch actuation system of a clutch-controlled transverse compensation unit working without differential, with two clutches, a clutch control valve per clutch, and an oiling control valve in a clutch oiling line and an additional component oiling.

FIG. 5 shows the clutch actuation system shown in FIG. 4 for a transverse compensation unit working without differential, as has already been shown in FIGS. 2 and 3.

Figure 6:
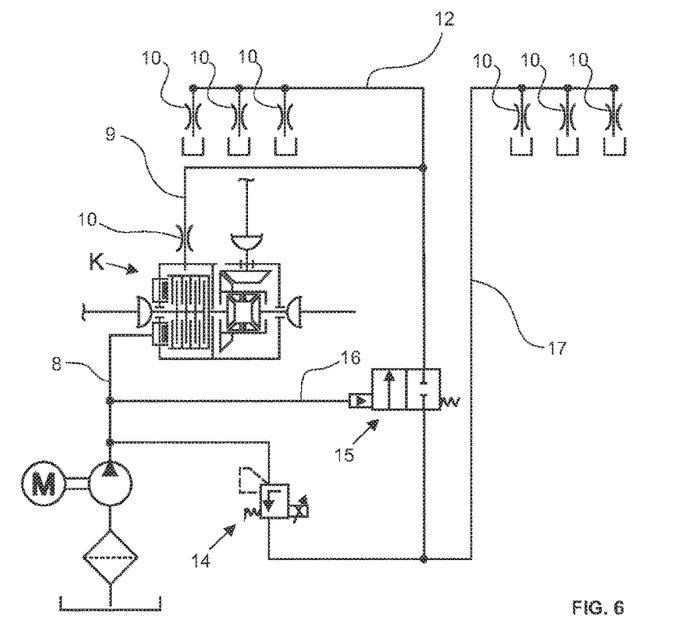
FIG. 6: a diagrammatic depiction of a hydraulic clutch actuation system of a clutch-controlled transverse compensation unit with a clutch and positive-action differential with an oiling control valve and a shut-off valve in a clutch oiling line and with an additional component oiling.
Figure 7:
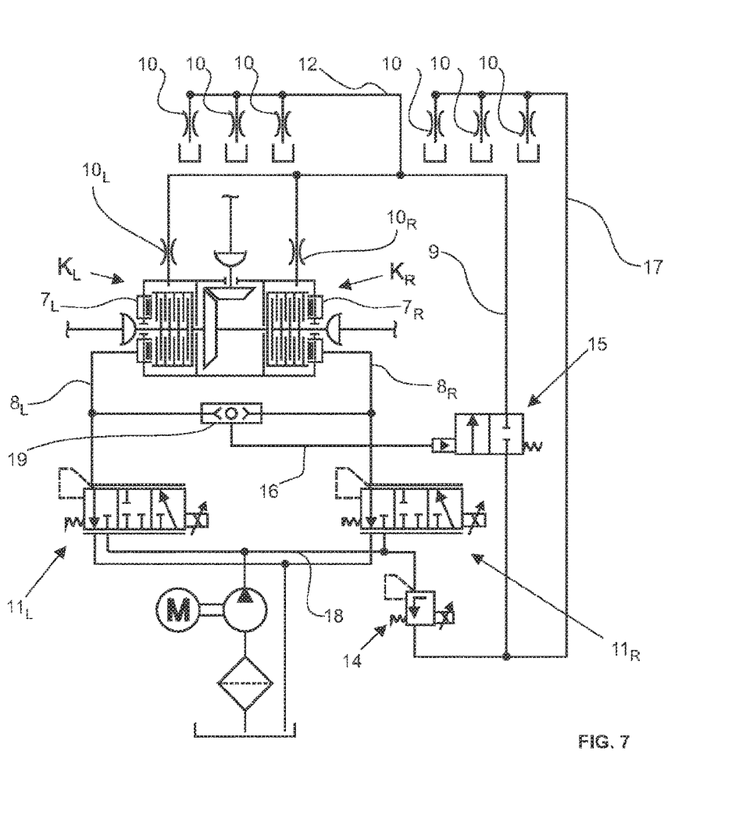
FIG. 7: a diagrammatic depiction of a hydraulic clutch actuation system of a clutch-controlled transverse compensation unit working without differential, with two clutches, a clutch control valve per clutch, and an oiling control valve and a shut-off valve controlled via clutch pressure in a clutch oiling line, and an additional component oiling.
Figure 8:
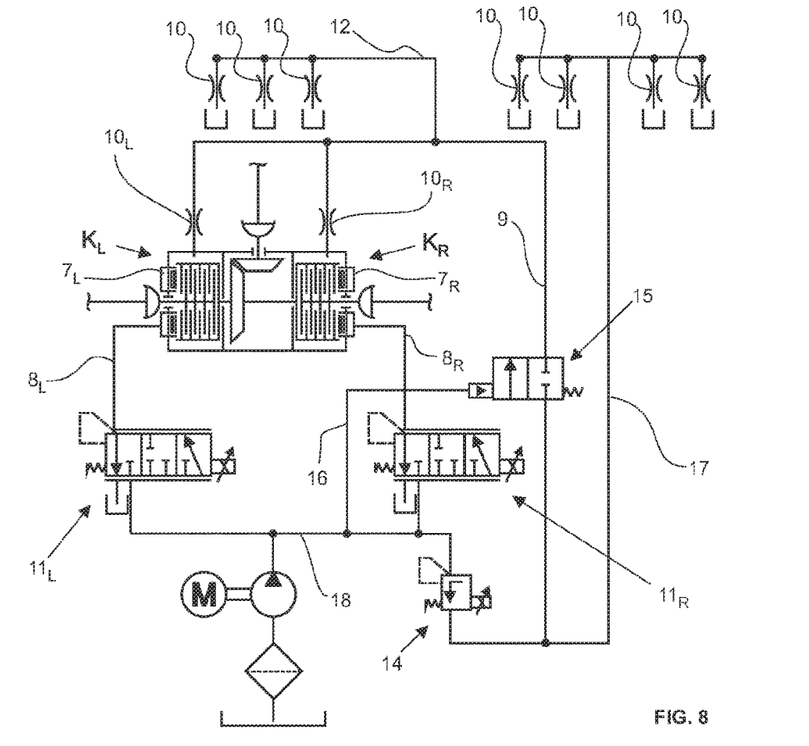
FIG. 8: an embodiment corresponding to FIG. 7 in which the shut-off valve is controlled via the pressure prevailing in a distribution line.

FIG. 6, FIG. 7 and FIG. 8 illustrate a further possible embodiment of a clutch actuation system with a shut-off valve 15 in the clutch oiling line, via which the oiling line leading to the clutches can be blocked or opened depending on operating state.

The shut-off valve can be formed by a seat-type valve and can be pressure-controlled so that it opens the clutch oiling line when a predefined opening pressure threshold is exceeded. Also, spool-type valves may be used, wherein seat valves are preferred because of their simpler structure, higher load-bearing capacity, lower susceptibility to leakage and low sensitivity to contamination in the hydraulic system. The shut-off valve may however also be electronically controllable. The shut-off valve can be normally closed. The switching point or opening pressure threshold may lie between 2 bar and 4 bar.

By providing such a shut-off valve, it is possible for a component oiling line 17 to branch off the clutch oiling line at a branch point downstream of the oiling control valve but upstream of the shut-off valve, and supply oil to components which may require oiling independently of the oiling demand of the clutches. The arrangement shown in the figures, with the oiling control valve 14, the shut-off valve 15 and the position of the branch point for the component oiling line 17, allows targeted oiling of components independently of any oiling demand at the clutches.

Thus with the embodiment shown in FIGS. 6, 7 and 8, by closing the oiling control valve 14, the component oiling can be stopped completely or set to a specific volume flow, while the oiling line leading to the clutches is opened only if the clutch pressure (FIG. 6 and FIG. 7), or the system pressure prevailing in a distribution line 18 upstream of the clutch control valves $11_L$ and $11_R$, exceeds the opening pressure threshold of the shut-off valve 15.

In FIG. 6 and FIG. 7, the pressure-controlled shut-off valve 15 is connected on the control side to the clutch pressure line or lines 8 via a control line 16. In this way, the pressure prevailing in the clutch pressure lines is decisive for determining whether or not the opening pressure threshold has been exceeded.

In the exemplary embodiment shown in FIG. 7, the clutch pressure lines $8_L$ and $8_R$ are connected to the control line via a changeover valve 19, so that always the higher pressure prevailing in the two clutch control lines is decisive for determining whether or not the pressure-controlled shut-off valve 15 opens the oiling line.

In the exemplary embodiment shown in FIG. 8, the control line 16 is connected to a distribution line 18. Here, it is not the clutch actuation pressure set by the clutch control valves $11_L$ or $11_R$ in the clutch pressure lines which is decisive for determining whether or not the opening pressure threshold of the switchover valve 15 has been exceeded, but the system pressure supplied by the hydraulic pump into the distribution line 18.

The embodiments shown in FIGS. 6, 7 and 8 enable the oil volume flow for the clutches to be controlled independently of the vehicle speed, differential rotation speeds at the drive wheels, and the amount of clutch torque. The oil volume flow, in particular the clutch oil volume flow but also any volume flow for any other component oiling, may therefore be adapted directly to the respective requirements depending on operating state, and allows a rapid and complete stoppage of clutch oiling even during oiling of other components which must be oiled independently of the clutches.

LIST OF REFERENCE SIGNS

1 Transverse compensation unit
2 Input member
3 Drive wheel
4 Crown wheel
5 Input plate carrier
6 Output plate carrier
$7_{(L,R)}$ Clutch actuator
$8_{(L,R)}$ Clutch pressure line
$9_{(L,R)}$ Clutch oiling line
$10_{(L,R)}$ Oiling diaphragm
$11_{(L,R)}$ Clutch control valve
12 Oiling branch
13 Main oiling diaphragm
14 Oiling control valve
15 Shut-off valve
16 Control line
17 Component oiling line
18 Distribution line
19 Changeover valve
K Clutch
M Electric motor
P Hydraulic pump

The invention claimed is:

1. A hydraulic clutch actuation system for actuation of at least one friction clutch of a clutch-controlled compensation unit for a motor vehicle, comprising:
    a hydraulic pump operable independently of a driving state for generating hydraulic pressure in a hydraulic fluid, wherein at least one clutch actuation device is provided for actuating the at least one friction clutch, on which the hydraulic pressure generated by the hydraulic pump by means of the hydraulic fluid may act as a clutch pressure via a clutch pressure line, and wherein the compensation unit comprises assembly components, which are to be oiled with cooling and/or lubricating oil for lubrication and/or cooling via an oiling line, and
    at least one clutch control valve via which the clutch pressure is controlled, wherein the clutch pressure line is formed by a line portion running between the at least one clutch control valve and the clutch actuation device, and wherein the oiling line branches off the clutch pressure line downstream of the clutch control valve;
    wherein a volume flow conveyed by the hydraulic pump is conducted at least partially to the assembly components as cooling or lubricating oil.

2. The system of claim 1, wherein the clutch actuation system is configured for at least one of (a) under a high hydraulic pressure provided by the hydraulic pump, a supply of cooling and lubricating oil to the assembly components of the at least one friction clutch is guaranteed, or (b) such that it is able to provide a high oil volume flow for clutch oiling when the hydraulic pump provides a high-pressure for transmission of a high torque.

3. The system of claim 1, wherein at least one oiling diaphragm is provided in the oiling line.

4. The system of claim 3, wherein the at least one oiling diaphragm is dimensioned such that under the operating pressures and operating temperatures prevailing in the clutch actuation system in proper use, it allows a volume flow in the oiling line of between 0 l/min and 1.5 l/min.

5. The system of claim 1, wherein the clutch actuation system is configured such that the oiling line is supplied with cooling and/or lubricating oil only if the clutch pressure line is also loaded with clutch pressure.

6. The system of claim 1, wherein the oiling line has one or more oiling branches, and a main oiling diaphragm is arranged in the oiling line upstream of the oiling branches.

7. The system of claim 6, wherein a further oiling diaphragm is provided in at least one oiling branch in addition to the main oiling diaphragm provided in the oiling line.

8. The system of claim 1, wherein an oiling control valve is arranged in the oiling line.

9. The system of claim 8, wherein one or more component oiling lines branch off the oiling line.

10. The system of claim 9, wherein the oiling control valve is connected upstream of the branch point of the one or more component oiling lines.

11. The system of claim 1, wherein a shut-off valve is arranged in the oiling line and only opens the oiling line if an adequate opening pressure threshold has been reached.

12. The system of claim 11, wherein an oiling control valve is connected upstream of the shut-off valve.

13. The system of claim 1, wherein a first clutch pressure line is provided for a first friction clutch, and a second clutch pressure line is provided for a second friction clutch, to load the clutch actuation devices of the two clutches with clutch pressure, wherein the first clutch pressure line and the second clutch pressure line are each connected to an input of a changeover valve, and wherein the shut-off valve is connected on the control side to the output of the changeover valve via a control line.

14. The system of claim 1, wherein a shut-off valve is connected on a control side to a distribution line via a control line, wherein the control line branches off the distribution line at a branch point, and wherein an oiling control valve is arranged between the branch point and the shut-off valve.

15. The system of claim 1, wherein the hydraulic pump is controlled by rotation speed or regulated by pressure and driven in rotation via an electric motor.

16. The system of claim 1, wherein the compensation unit comprises friction members of the at least one friction clutch.

17. The system of claim 1, wherein the oiling line is a clutch oiling line.

18. A method for operating a clutch-controlled compensation unit including a hydraulic clutch actuation system for actuation of at least one friction clutch of the clutch-controlled compensation unit for a motor vehicle, comprising a hydraulic pump operable independently of a driving state for generating hydraulic pressure in a hydraulic fluid, wherein at least one clutch actuation device is provided for actuating the at least one friction clutch, on which the hydraulic pressure generated by the hydraulic pump by means of the hydraulic fluid may act as a clutch pressure via a clutch pressure line, and wherein the compensation unit comprises assembly components, which are to be oiled with cooling and/or lubricating oil for lubrication and/or cooling via an oiling line, wherein a volume flow conveyed by the hydraulic pump is conducted at least partially to the assembly components as cooling or lubricating oil, the method comprising:

generating a hydraulic pressure in a hydraulic fluid by means of a hydraulic pump which can be driven independently of driving state;

loading a clutch actuation device of the at least one friction clutch comprising friction members with a hydraulic clutch pressure via a clutch pressure line, and oiling assembly components of the compensation unit, including the friction members of the at least one friction clutch, with cooling and/or lubricating oil via an oiling line for the purpose of lubricating and/or cooling the assembly components including the friction members, wherein the hydraulic fluid is supplied as cooling or lubricating oil to the assembly components, including the friction members, for oiling, and wherein the clutch actuation system further comprises at least one clutch control valve via which the clutch pressure is controlled, wherein the clutch pressure line is formed by a line portion running between the at least one clutch control valve and the clutch actuation device, and wherein the oiling line branches off the clutch pressure line downstream of the clutch control valve.

19. The method of claim 18, wherein under the operating pressures and operating temperatures prevailing in proper use, the volume flow of the hydraulic fluid supplied to the assembly components is between 0 l/min and 1.5 l/min per clutch.

20. The method of claim 18, wherein the oiling line is only supplied with cooling or lubricating oil if the clutch pressure line is also loaded with pressure, and wherein a shut-off valve is arranged in the oiling line and only opens the oiling line if an adequate opening pressure threshold has been reached, and wherein a high oil volume flow is provided for the clutch oiling when the hydraulic pump provides a high pressure for transmitting a high torque.

* * * * *